No. 729,662. PATENTED JUNE 2, 1903.
B. P. REMY.
ELECTRIC IGNITION GENERATOR.
APPLICATION FILED APR. 17, 1902.
NO MODEL.

Witnesses:
Louis T. Dorsh.
G. A. Palmer.

Inventor:
Benjamin P. Remy.

No. 729,662. Patented June 2, 1903.

UNITED STATES PATENT OFFICE.

BENJAMIN P. REMY, OF ANDERSON, INDIANA, ASSIGNOR TO REMY ELECTRIC COMPANY, OF ANDERSON, INDIANA, A CORPORATION OF INDIANA.

ELECTRIC IGNITION-GENERATOR.

SPECIFICATION forming part of Letters Patent No. 729,662, dated June 2, 1903.

Application filed April 17, 1902. Serial No. 103,296. (No model.)

*To all whom it may concern:*

Be it known that I, BENJAMIN P. REMY, a citizen of the United States, residing at Anderson, in the county of Madison and State of Indiana, have invented a new and useful Improvement in Electric Ignition Generators, of which the following is a specification.

My invention relates to improvements in small electric generators, (used for furnishing electric current to produce the spark for igniting internal-combustion or hydrocarbon motors or other purposes,) in which an armature running in a magnetic field generates an electric current, which is collected by a suitable commutator and brushes and carried by suitable circuit-wires either direct, through a self-induction, or through a Ruhmkorff or jump-spark induction-coil into the explosion-chamber of engine; and the objects of my invention are, first, to provide an efficient, simple, and reliable generator for the purpose mentioned; second, to make the same operate perfectly with a minimum of attention; third, to make the same as nearly automatic in operation as possible and so flexible in its functions as to work perfectly under a great variety of conditions. I accomplish these objects by the mechanism illustrated by the accompanying drawings, in which—

Figure 1:
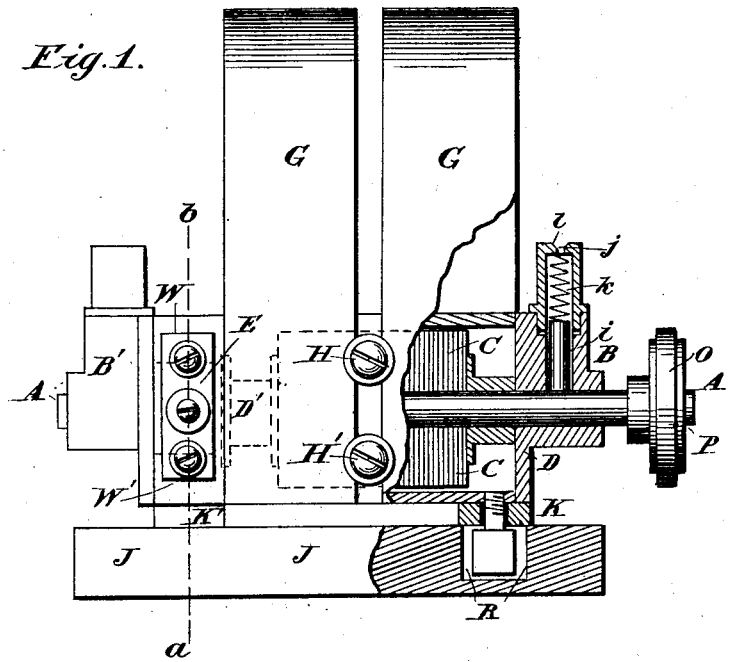
Figure 2:
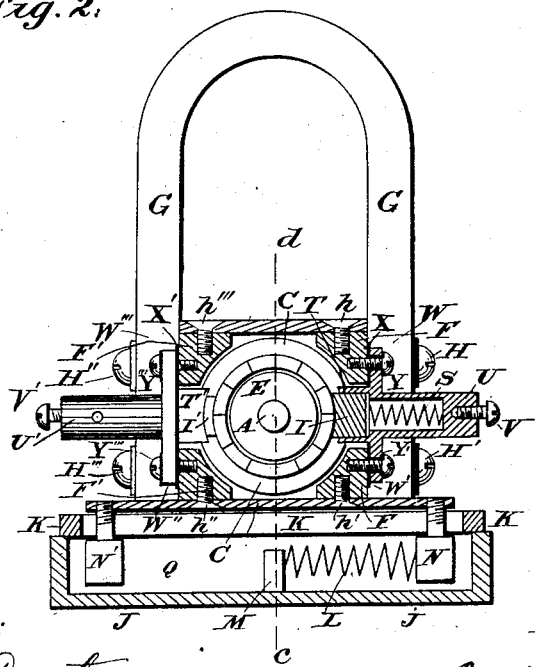

Figure 1 is a side view with a part cut away, showing a section on the line $c\,d$ in Fig. 2, Fig. 2 is an end view with part cut away, showing a section on the line $a\,b$ in Fig. 1.

Similar letters refer to similar parts throughout the several views.

The shaft A A, rotating in bearings B B', carries the armature laminations C C and the commutator E so that they are revolved together as a complete armature. The armature-core C C is wound with insulated wire in the ordinary manner and connected to commutator E.

The pole-pieces F F and F' F' embrace the armature, as shown, and powerful permanent magnets G G are attached to the pole-pieces F F and F' F' by screws H, H', H'', and H'''.

By revolving the armature a current of electricity is generated in the wires wound on the core C C, as described, and collected from commutator E by suitable brushes and delivered to the external circuit-wires when same are connected to binding-screws V and V'.

The pole-pieces F and F' rest on a plate Z, to which are attached the studs N and N', projecting through the slotted rails K' and K', which may be screwed to base J, and are retained in place by headed studs N and N', which fit loosely in the slots K and K, allowing the machine to move horizontally along a line at right angles to the shaft.

The wooden base J J J has two grooves routed across it under the slotted rails K' and K', into which the headed studs N and N' project. The groove Q also contains spring L, which presses against the stud N and reacts against the stationary block M. The groove R is fitted with studs, spring, and block, identical with N, L, and M, but not shown, being removed in Fig. 1 to show the section. The springs exert a pressure tending to move the machine bodily along the rails K' and K', and it is evident that friction-pulley O will be held with even pressure against a driving-pulley that may be placed against pulley O at point P or thereabout.

If the spring L be removed from between N and M and placed between N' and M and the spring in groove R be moved in corresponding manner, it is evident that the machine will be held toward the opposite side of base J and that the friction-pulley O will be held with even tension against the driving-wheel that may be placed against O at point diametrically opposite P. If a belt be used, the mechanism will work equally well as a belt-tightener.

I am aware that prior to my invention dynamos and magneto-generators have been used for igniting engines and that same have been pivotally mounted, both horizontally and perpendicularly; but What I do claim as my invention, and desire to secure by Letters Patent, is—

1. The combination of a dynamo or magneto electric generator mounted slidingly on parallel rails and a spring or springs adapted to adjust same with relation to a driving mechanism.

2. The combination of a dynamo or a magneto electric generator mounted slidingly on a base so as to move bodily along a line at right angles to shaft of said dynamo or magneto electric generator and a suitable spring or springs to automatically maintain said dynamo or magneto machine in proper relation to driving mechanism.

BENJAMIN P. REMY.

Witnesses:
B. L. COSTELLO,
FRANK I. REMY.